US008997197B2

(12) United States Patent
Nord et al.

(10) Patent No.: US 8,997,197 B2
(45) Date of Patent: Mar. 31, 2015

(54) ENCRYPTION-BASED DATA ACCESS MANAGEMENT

(71) Applicant: Citrix Systems, Inc., Fort Lauderdale, FL (US)

(72) Inventors: Joseph Nord, Lighthouse Point, FL (US); Benjamin Elliot Tucker, Parkland, FL (US); Timothy Gaylor, Plantation, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 30 days.

(21) Appl. No.: 13/712,333

(22) Filed: Dec. 12, 2012

(65) Prior Publication Data

US 2014/0164774 A1 Jun. 12, 2014

(51) Int. Cl.
*G06F 21/00* (2013.01)
*G06F 17/30* (2006.01)
*G06F 21/60* (2013.01)
*G06F 21/62* (2013.01)
*H04L 29/06* (2006.01)
*G06F 9/00* (2006.01)
*H04L 9/12* (2006.01)
*H04L 9/08* (2006.01)

(52) U.S. Cl.
CPC .............. *G06F 17/30* (2013.01); *G06F 21/602* (2013.01); *G06F 21/6218* (2013.01); *H04L 63/064* (2013.01); *H04L 63/0807* (2013.01); *G06F 9/00* (2013.01); *H04L 9/12* (2013.01); *H04L 63/105* (2013.01); *H04L 9/0869* (2013.01)
USPC ....................... 726/9; 726/5; 726/26; 713/171

(58) Field of Classification Search
None
See application file for complete search history.

(56) References Cited

U.S. PATENT DOCUMENTS

| 2006/0248336 | A1* | 11/2006 | Bruns et al. .................... 713/171 |
| 2007/0283446 | A1* | 12/2007 | Yami et al. ....................... 726/27 |
| 2009/0254572 | A1* | 10/2009 | Redlich et al. .................. 707/10 |
| 2010/0043070 | A1* | 2/2010 | Okada et al. ..................... 726/21 |
| 2013/0219176 | A1* | 8/2013 | Akella et al. ................... 713/165 |
| 2013/0219456 | A1* | 8/2013 | Sharma et al. ..................... 726/1 |
| 2013/0297662 | A1* | 11/2013 | Sharma et al. ................ 707/827 |

* cited by examiner

*Primary Examiner* — Jeffrey Williams
(74) *Attorney, Agent, or Firm* — Banner & Witcoff, Ltd.

(57) ABSTRACT

Encryption-based data access management may include a variety of processes. In one example, a device may transmit a user authentication request for decrypting encrypted data to a data storage server storing the encrypted data. The computing device may then receive a validation token associated with the user's authentication request, the validation token indicating that the user is authenticated to a domain. Subsequently, the computing device may transmit the validation token to a first key server different from the data storage server. Then, in response to transmitting the validation token the computing device may receive, from the first key server, a key required for decrypting the encrypted data. The device may then decrypt at least a portion of the encrypted data using the key.

24 Claims, 9 Drawing Sheets

ENCRYPTION-BASED DATA ACCESS MANAGEMENT

TECHNICAL FIELD

Aspects of the disclosure relate generally to data storage and access management.

BACKGROUND

Many enterprises, companies, organizations and other entities maintain a large amount of data. Much or all of this data may contain sensitive information, such as trade secrets, business methods, client information, or other such data. Companies often wish to protect such data by restricting access to those with a need-to-know. Maintaining data on a large scale may sometimes be difficult and expensive. Moreover, with an increasing global economy, organizations may have contractors, employees, or others that access the data from all over the planet. Making such data available on a wide-area network, such as the Internet, provides improved convenience for employees and others with access to the data, but increases the security risk. Hackers, disgruntled employees, or other rogue individuals may attempt to attack, compromise, or even merely access the sensitive data.

BRIEF SUMMARY

Described are example embodiments, features and other aspects of providing data access management using encryption. In one example embodiment, encrypted data is stored on a data storage server. A computing device is used by a user wishing to access the encrypted data. The computing device transmits the user's authentication credentials to the data storage server. The data storage server authenticates the user to a domain server, and determines the user's domain group memberships. The data storage server transmits a validation token to the computing device. The computing device then transmits the validation token to one or more key vault servers (e.g., two, three, five, ten, etc.). Each key vault server confirms with the data storage server that the computing device authenticated to the data storage server, and that the user or device has the appropriate access privileges, then transmits a decryption key or secret. The computing device uses the first decryption key or secret received from the first key vault server and the second decryption key or secret received from the second key vault server to generate a decryption key. The generated decryption key is then used to decrypt the encrypted data. Accordingly, the decryption key management may be handled separately from the data storage. Thus, in some examples, in order to access the data in unencrypted form, access to the key vault servers may be required.

Details of various example embodiments, aspects and features of the disclosure are set forth in the accompanying drawings and the description below.

BRIEF DESCRIPTION OF THE FIGURES

The foregoing and other objects, aspects, features, and advantages will become more apparent and better understood by referring to the following description taken in conjunction with the accompanying drawings, in which.

Figure 1:
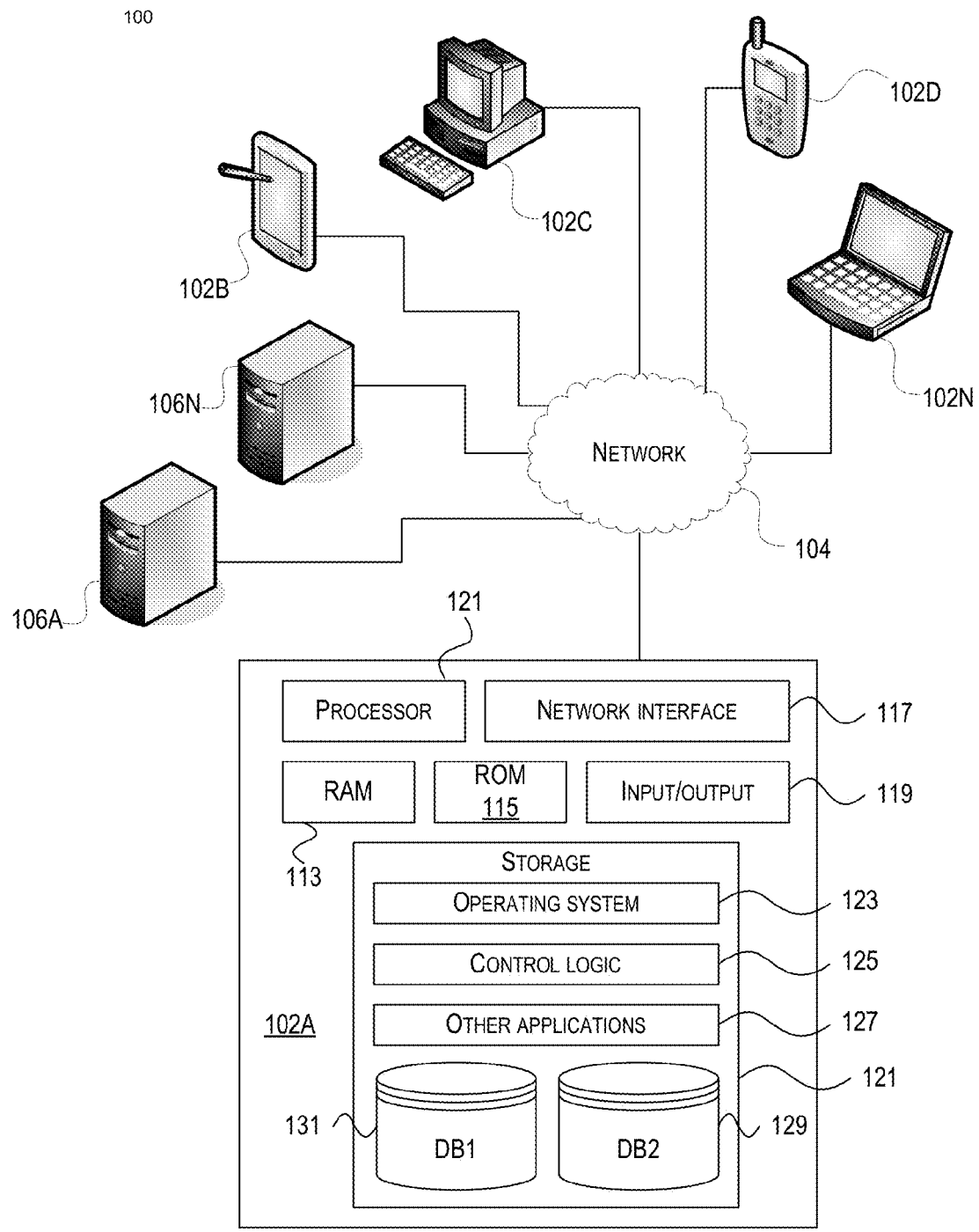
FIG. 1 is a block diagram illustrative of an embodiment of a remote-access, networked environment with a client machine that communicates with a server according to aspects described herein.

The features and advantages of aspects of the present disclosure will become more apparent from the detailed description set forth below when taken in conjunction with the drawings, in which like reference characters identify corresponding elements throughout. In the drawings, like reference numbers generally indicate identical, functionally similar, or structurally similar elements.

DETAILED DESCRIPTION

In enterprises or companies with remote or traveling users with mobile computing devices, it may be desirable to allow the users to access secure data remotely. For an enterprise with a large number of employees or clients, the amount of data to be managed might be very large, leading to high costs for storage devices, as well as extremely complex or complicated data management procedures.

Accordingly, aspects discussed herein provide for storing and managing encryption keys separately from encrypted data storage. For example, a company (or other entity) may rent or buy large amounts of storage space from a cloud-based storage provider, such as DROPBOX, INC. of San Francisco, Calif. Moreover, in some environments, the cloud-based storage server may be located outside of the company or entity domain. The data stored on the DROPBOX servers is encrypted, but DROPBOX administrators or employees do not have access to decryption keys. Decryption keys are stored on or managed by one or more key vault servers controlled by the company wishing to protect the security of the encrypted data. The company may maintain two or more key vault servers, each providing a part of a decryption key. Thus, in one embodiment, if there are two key vault servers, in order to access an encrypted file, a user may access a first key and a second key, which may be combined to create a decryption key used to decrypt the data. An attacker or other unauthorized user, therefore, would be required to obtain the encrypted data from a storage server, and encryption keys from multiple key vault servers. Thus, maintaining decryption keys separately from the data storage may increase, in some examples, the level of protection and security for encrypted company data, and furthermore companies may reduce their data storage costs by using cloud-based storage solutions.

Additionally or alternatively, some existing solutions assume that the user's machine is a corporate asset and is a member of a corporate or other organizational domain, and utilize domain management properties and policies. These solutions thus require the user's machine to be a member in the domain. For example, BITLOCKER by MICROSOFT CORP. of Redmond, Wash. stores key information for encrypted data in an Active Directory space associated with the user. Since Domain Administrators are "trusted," any domain administrator can access the key for any encrypted data to which the administrator wants access. But some entities might not want every domain administrator to have access to all encrypted data in the system. Therefore, within the domain there may be different levels of data access rights for different levels of administrators. Aspects described herein provide the ability to implement different levels of domain administrators.

Prior to discussing specifics of file based encryption key management, the following description provides an overview of an exemplary computing environment that may be used in conjunction with various aspects. FIG. 1 illustrates an example embodiment of a computing environment that includes one or more client machines 102A-102N (generally referred to herein as "client machine(s) 102") in communication with one or more servers 106A-106N (generally referred to herein as "server(s) 106"). Installed in between the client machine(s) 102 and server(s) 106 is a network 104.

In one embodiment, the computing environment 100 may include an appliance installed between the server(s) 106 and client machine(s) 102. This appliance may mange client/server connections, and in some cases may load balance client connections amongst a plurality of backend servers.

The client machine(s) 102 may, in some examples, be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 may, in some example, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 102 can be a virtual machine. The virtual machine can be any virtual machine, while in some embodiments the virtual machine can be any virtual machine managed by a hypervisor developed by XEN-SOLUTIONS, CITRIX SYSTEMS, IBM, VMWARE, or any other hypervisor. In other embodiments, the virtual machine may be managed by any hypervisor, while in still other embodiments, the virtual machine can may managed by a hypervisor executing on a server 106 or a hypervisor executing on a client 102.

The client machine 102 can in some embodiments execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments may include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted). Applications may be remoted in multiple ways. In one example, applications may be remoted in a seamless manner in which windows are created on the client device so as to make the application display seem as if it were running locally on the client device and the desktop thereof. In another example, a remoted application may be provided in a windowed mode where a desktop is remoted to the client device and the application is displayed as an application executing in the remoted desktop. Various other remoting methods and techniques may also be implemented or used.

The server 106, in some embodiments, may execute a remote presentation client or other client or program that uses a thin-client or remote-display protocol to capture display output generated by an application executing on a server 106 and to transmit the application display output to a remote client 102. The thin-client or remote-display protocol can be any one of the following protocols: the Independent Computing Architecture (ICA) protocol manufactured by CITRIX SYSTEMS, Inc. of Ft. Lauderdale, Fla.; or the Remote Desktop Protocol (RDP) manufactured by the MICROSOFT Corporation of Redmond, Wash.

The computing environment 100 may include more than one server 106A-106N such that the servers 106A-106N are logically grouped together into a server farm 106. The server farm 106 may include servers 106 that are geographically dispersed and logically grouped together in a server farm 106, or servers 106 that are located proximate to each other and logically grouped together in a server farm 106. Geographically dispersed servers 106A-106N within a server farm 106 may, in some examples, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some examples, a server farm 106 may include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 may include a first group of servers 106 that execute a first type of operating system platform, and a second group of servers 106 that execute a second type of operating system platform. The server farm 106, in other embodiments, may include servers 106 that execute different types of operating system platforms.

The server 106, in some examples, may be any server type. For instance, the server 106 may be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 may be an appliance manufactured by, for example, any one of the following manufacturers: the Citrix Application Networking Group; Silver Peak Systems, Inc.; Riverbed Technology, Inc.; F5 Networks, Inc.; or Juniper Networks, Inc. Some embodiments include a first server 106A that receives requests from a client machine 102, forwards the request to a second server 106B (not shown), and responds to the request generated by the client machine 102 with a response from the second server 106B. The first server 106A may acquire an enumeration of applications available to the client machine 102 and well as address information associated with an application server 106 hosting an application identified within the enumeration of applications. The first server 106A may then present a response to the client's request using a web interface, and communicate directly with the client 102 to provide the client 102 with access to an identified application.

The server 106 may, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER or XENAPP; MICROSOFT WINDOWS Terminal Services manufactured by the Microsoft Corporation; or an ICA client, developed by Citrix Systems, Inc. Other examples or embodiments may include a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments or examples may include a server 106 that executes any one of the following types of hosted server applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 may, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 100. The network 104 can comprise one or more sub-networks, and can be installed between any combination of the clients 102, servers 106, computing machines and appliances included within the computing environment 100. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices.

FIG. 1 includes an illustration of an embodiment of a computing device 102A. The client machine 102 and server 106 can be deployed as and/or executed on any embodiment of the computing device 102A illustrated and described herein. Included within the computing device 102A is a system bus that communicates with the following components: a central processing unit 121; a main memory 113; storage memory 121; read only memory (ROM) 115; an input/output (I/O) controller 119; display devices; an installation device; and a network interface 117. In one embodiment, the storage memory 121 includes: an operating system 123, control logic 125, other applications 127, a first database 131, a second database 129, software routines, and a client agent. The I/O controller 119, in some embodiments, is further connected to a keyboard and a pointing device. Other embodiments may include an I/O controller 119 connected to more than one input/output device.

Embodiments of the computing machine 102A can include a central processing unit 121 characterized by any one of the following component configurations: logic circuits that respond to and process instructions fetched from the main memory unit 113; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 121 may include any combination of the following: a microprocessor, a microcontroller, a central processing unit with a single processing core, a central processing unit with two processing cores, or a central processing unit with more than one processing core.

While FIG. 1 illustrates a computing device 102A that includes a single central processing unit 121, in some embodiments the computing device 102A can include one or more processing units 121. In these embodiments, the computing device 102A may store and execute firmware or other executable instructions that, when executed, direct the one or more processing units 121 to simultaneously execute instructions or to simultaneously execute instructions on a single piece of data. In other embodiments, the computing device 102A may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121 may in some embodiments access available memory as a global address space, or in other embodiments, memory within the computing device 102A can be segmented and assigned to a particular core within the processing unit 121. In one embodiment, the one or more processing cores or processors in the computing device 102A can each access local memory. In still another embodiment, memory within the computing device 102A can be shared amongst one or more processors or processing cores, while other memory can be accessed by particular processors or subsets of processors. In embodiments where the computing device 102A includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 102A includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 102A can include any number of SIMD and MIMD processors.

The computing device 102A, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 102A can include one or more processing units 121, where at least one processing unit 121 is dedicated to processing and rendering graphics.

One embodiment of the computing machine 102A includes a central processing unit 121 that communicates with cache memory via a secondary bus also known as a backside bus, while another embodiment of the computing machine 102A includes a central processing unit 121 that communicates with cache memory via the system bus. The local system bus can, in some embodiments, also be used by the central processing unit to communicate with more than one type of I/O device. In some embodiments, the local system bus can be any one of the following types of buses: a VESA VL bus; an ISA bus; an EISA bus; a MicroChannel Architecture (MCA) bus; a PCI bus; a PCI-X bus; a PCI-Express bus; or a NuBus. Other embodiments of the computing machine 102A include an I/O device that is a video display that communicates with the central processing unit 121. Still other versions of the computing machine 102A include a processor 121 connected to an I/O device via any one of the following connections: HyperTransport, Rapid I/O, or InfiniBand. Further embodiments of the computing machine 102A include a processor 121 that communicates with one I/O device using a local interconnect bus and a second I/O device using a direct connection.

The computing device 102A, in some embodiments, includes a main memory unit 113 and cache memory. The cache memory can be any memory type, and in some embodiments can be any one of the following types of memory: SRAM; BSRAM; or EDRAM. Other embodiments include cache memory and a main memory unit 113 that can be any one of the following types of memory: Static random access memory (SRAM), Burst SRAM or SynchBurst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 113 via: a system bus; a memory port; or any other connection, bus or port that allows the processor 121 to access memory 113.

One embodiment of the computing device 102A provides support for any one of the following installation devices: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent, or any portion of a client agent. The computing device 102A may further include a storage device 121 that can be either one or more hard disk drives, or one or more redundant arrays of independent disks; where the storage device is configured to store an operating system, software, programs applications, or at least a portion of the client agent. A further embodiment of the computing device 102A includes an installation device that is used as the storage device 121.

The computing device 102A may further include a network interface 117 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 102A includes a network interface 117 able to communicate with additional computing devices 102' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 117 can comprise any one of: a built-in network adapter; a network interface card; a PCMCIA network card; a card bus network adapter; a wireless network adapter; a USB network adapter; a modem; or any other device suitable for interfacing the computing device 102A to a network capable of communicating and performing the methods and systems described herein. Another version of the network interface 117 allows the computing device 102A to communicate with one or more cellular networks, including 3G, 4G, and the like.

Embodiments of the computing device 102A include any one of the following I/O devices: a keyboard; a pointing device; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 119 may in some embodiments connect to multiple I/O devices to control the one or more I/O devices. Some embodiments of the I/O devices may be configured to provide storage or an installation medium, while others may provide a universal serial bus (USB) interface for receiving USB storage devices such as the USB Flash Drive line of devices manufactured by Twintech Industry, Inc. Still other embodiments include an I/O device that may be a bridge between the system bus and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 102A can connect to multiple display devices, in other embodiments the computing device 102A can connect to a single display device, while in still other embodiments the computing device 102A connects to display devices that are the same type or form of display, or to display devices that are different types or forms. Embodiments of the display devices can be supported and enabled by the following: one or multiple I/O devices; the I/O controller 119; a combination of I/O device (s) and the I/O controller 119; any combination of hardware and software able to support a display device; any type and/or form of video adapter, video card, driver, and/or library to interface, communicate, connect or otherwise use the display devices. The computing device 102A may in some embodiments be configured to use one or multiple display devices, these configurations include: having multiple connectors to interface to multiple display devices; having multiple video adapters, with each video adapter connected to one or more of the display devices; having an operating system configured to support multiple displays; using circuits and software included within the computing device 102A to connect to and use multiple display devices; and executing software on the main computing device 102A and multiple secondary computing devices to enable the main computing device 102A to use a secondary computing device's display as a display device for the main computing device 102A. Still other embodiments of the computing device 102A may include multiple display devices provided by multiple secondary computing devices and connected to the main computing device 102A via a network.

In some embodiments, the computing machine 102A can execute any operating system, while in other embodiments the computing machine 102A can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 102A can execute multiple operating systems. For example, the computing machine 102A can execute PARALLELS or another virtualization platform that can execute or manage a virtual machine executing a first operating system, while the computing machine 102A executes a second operating system different from the first operating system.

The computing machine 102A may be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 102A may be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, 750, Pre, Pre Plus, Pixi, Pixi Plus, Pre 2, or Pre 3 smart phone manufactured by Palm, Inc; any computing device that has different processors, operating systems, and input devices consistent with the device; or any other mobile computing device capable of performing the methods and systems described herein. In still other embodiments, the computing device 102A can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device. In yet still other embodiments, the computing device 102A may a smart phone or tablet computer, including products such as the iPhone or iPad manufactured by Apple, Inc. of Cupertino, Calif.; the BlackBerry devices manufactured by Research in Motion, Ltd. of Waterloo, Ontario, Canada; Windows Mobile devices manufactured by Microsoft Corp., of Redmond, Wash.; the Xoom manufactured by Motorola, Inc. of Libertyville, Ill.; devices capable of running the Android platform provided by Google, Inc. of Mountain View, Calif.; or any other type and form of portable computing device.

Some aspects, features, or embodiments described herein may make use of encryption. Encryption may include any one or more of various means, methods, systems, functions, etc. for transforming data from an interpreted form and securing it by a process that renders the data uninterpretable to anyone but those that are able to decrypt the encrypted data. Encryption may also include to a wide variety of encryption standards and techniques, including private key and public key encryption. Encryption and decryption may be accomplished via a system implementing passwords, keys, or a combination of both. Encryption schemes may include symmetric-key encryption schemes where secret keys are exchanged between the party seeking to encrypt data and the party seeking to decrypt data. Such schemes may also include "shared secret" or "pre-shared" encryption schemes. Examples of such encryption schemes may include the Advanced Encryption Standard, Blowfish, Twofish, Serpent, CASTS, RC4, 3DES and IDEA.

Aspects, features, and embodiments described herein may make use of various encryption schemes and standards. For example, aspects, features, or embodiments described herein may make use of a "hash function," "hash," or "hashing". These include any procedure or mathematical function that receives data as an input and provides a given output in response to said input. Said output may be a hash value, or may be a message digest. The output of a hash may be a single datum or integer. The output of a hash may be a fixed-size bit string. A hash function may rely one or more keys to accomplish said hashing. Examples of hash functions known in the art include MD2 (Message-Digest algorithm), MD4, MD5, SHA-0 (Secure Hash Algorithm), SHA-1, SHA-2, GOST, HAVAL, PANAMA, RadioGatun, RIPEMD, Tiger, and WHIRLPOOL. Other hash functions may include hash-based message authentication code (HMAC) functions, such as HMAC-MD5, HMAC-SHA1, HMAC-SHA256, HMAC-SHA-512 and other HMACs that can be derived from hash functions.

Some aspects, features, or embodiments described herein may make use of public/private key encryption. Public key encryption may include any method or methods for transforming data into a form that can only be interpreted by the intended recipient, recipients, or otherwise intended audience. Public key encryption methods may involve the use of asymmetric key algorithms, where a key necessary to encrypt data is different from the key needed to decrypt the data. This allows the key with which to encrypt said data, the "Public Key," to be shared widely. Integrity of security is maintained because the separate key with which to decrypt the encrypted information remains secret. The secret key may also be a private key, and the combination of a public key and corresponding private key may be a public-private key pair. Thus, public key encryption does not require a secure initial exchange of one or more secret keys. Examples of asymmetric key implementations include DSS, RSA Encryption Algorithm, PGP, Internet Key Exchange, ZRTP, SSH, SSL, TLS, and SILC.

Some aspects, features, or embodiments described herein may use public keys or public key encryption, or alternatively or additionally may use any other form of encryption, including private key encryption or any other form of encryption.

Some aspects, features, or embodiments described herein may make use of symmetric-key or shared secret encryption. Alternatively, some aspects, features, or embodiments may use any other form of encryption to successfully implement the systems and methods disclosed herein, including public key encryption or any other form of encryption.

Some aspects, features, or embodiments described herein may make use of a "shared key" or "sharing keys" for the purposes of encryption or decryption. Shared keys may include keys that may be shared between a particular group of users. A shared key may be any type or form of key used in any type or form of encryption scheme or standard. In some examples, a shared key may be unique to a particular file or may be shared with only a single user, application, or process. Additionally or alternatively, a shared key may be an asymmetric private/public key pair.

Figure 2:
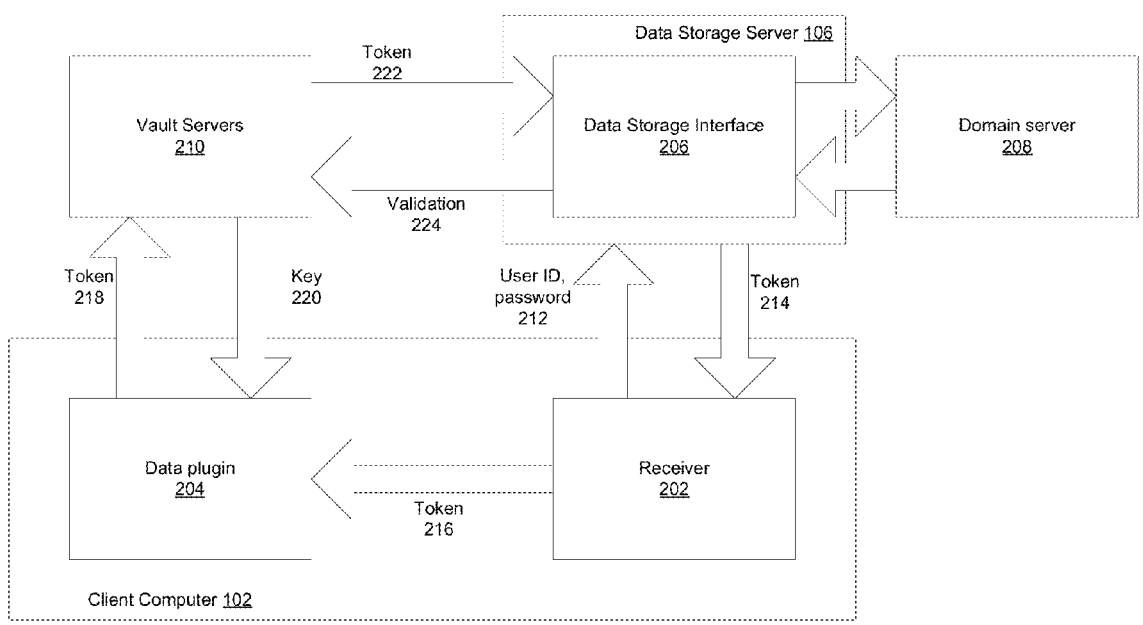
FIG. 2 is a block diagram illustrating a process of authentication for data access management according to aspects described herein.

Referring now to FIG. 2, illustrated is an example embodiment of a system utilizing encryption-based data access management. A client computer 102 may include a receiver 202 configured to coordinate and manage data access from one or more storage servers and sites. In some examples, the receiver 202 may be a software plugin that is installed on a client computer 102. The receiver 202 prompts for user authentication, or otherwise validates a user. The receiver 202 also receives a user request to access one or more files or folders comprising encrypted data. In one embodiment, the receiver 202 may authenticate the user when the user logs onto the computer. In another embodiment, the receiver 202 may receive a request by a user to access encrypted data, and then prompt the user for the credentials required to access the requested encrypted data.

The receiver 202 transmits a user authentication request to the data storage server 106 to confirm the identity and domain group memberships of the user. The user authentication request includes a request to access data including retrieval and decryption of one or more encrypted files or folders. The user authentication request may also include user authentication information, such as a user identifier and password 212. In another example embodiment, a username or password may not be required for authentication, with the system instead using another authentication method such as a smart card, hardware token, software token, biometric validation, certificate, or challenge-response.

In one aspect or embodiment, a user may be associated with a domain. A domain may be, in one example, a collection of security principals that share a central directory database. In another embodiment, a domain may be a service provider holding a security repository permitting clients with credentials to authenticate and be authorized. One example of a central database maintenance product is Active Directory, a product by MICROSOFT of Redmond, Wash. Each user within a domain, in one example, may receive a unique account, or username. The user account may, in another embodiment, be assigned to access resources within the domain. In another example, a user may be a part of a group, where a group includes one or more users, the group being assigned access to resources within the domain.

In response to receiving the user authentication request, the data storage server 106 may be configured to connect to a domain server 208 associated with the user identified in the user authentication request. A user may, in one embodiment, be associated with a domain by having an account within the domain. In another example, the user may be assigned as a member of a group in the domain. The domain server 208 determines if the user exists on the domain. If the user exists on the domain, and the authentication information, such as the user identifier and password 212, is correct, the domain server 208 determines the user's domain group memberships. A group may have one or more users on the domain. A user may be a member of one or more groups, or may not be a member of any groups. Groups within a domain may be assigned access privileges/rights for retrieving and decrypting various types of information. Accordingly, access rights may be controlled on a group basis without having to individually designate access rights for each user. In some embodiments, however, the domain may, alternatively or additionally, individually assign access privileges to each user. For example, users may have additional rights or privileges above access rights that are designated through their group membership.

If the domain determines that the user does not exist or has not authenticated correctly, the domain responds to the data storage server 106 that the user does not exist or has not authenticated correctly, and the data storage server 106 rejects the receiver's 202 request.

If the domain indicates that the user has authenticated, the data storage server 106 transmits a validation token 214 to the receiver 202. The validation token, in one embodiment, may include the user's domain group membership information transmitted from the domain server 208 to the data storage server 106. In another embodiment, the validation token simply verifies that the user has authenticated to the domain. The receiver 202, in response to receiving the validation token 214, transmits the validation token 216 to the data plugin 204.

The data plugin 204, upon receiving the validation token, initiates an authentication procedure with one or more vault servers 210. In one example embodiment, there are two vault servers 210, but there can be any number of vault servers, depending on the level of security and/or number of levels of security access desired or needed by the entity controlling access to the data. The vault servers 210 may be located at physical locations separate from the client computer 102, and also separate (physically or logically) from the data storage server 106. In one embodiment, the vault servers 210 are separate virtual machines, while in another embodiment, the vault servers 210 are separate physical machines. The process for each vault server may be the same, so the process in relation to the first vault server will be described.

The data plugin 204 transmits the device identifier uniquely identifying the client computer 106 to the vault server 210. The vault server 210, in one embodiment, maintains a database, table, or some other method for storing information about each device. Each device associated with the vault server has a device identifier associated with it. The device identifier could be a device Media Access Control (MAC) address, an Internet Protocol (IP) address, or some other unique device identifier associated with the device.

The vault server 210 maintains information about each device. For example, the vault server 210 may maintain decryption keys—also known as secrets—or portions thereof for each device. Files corresponding to different access privileges or credentials may be protected by different secrets or keys. Accordingly, a single user, who may have one device or multiple devices, may access the same files on the various devices so long as the user is appropriately authenticated and his or her access privileges verified. The vault server 210 may, in some examples, maintain information about each unique device. In another embodiment, the vault server does not maintain any information about a device, but determines a user or device's access privileges to an encrypted file or folder based on information included in the validation token.

As discussed above, the vault server 210 controls access to a single key associated with a particular file or data. In another embodiment, the vault server 210 controls a single key that all users of a particular file or data share access to. In another example, the vault server 210 controls one or more unique keys, each key unique to a device or a user and a particular file or data. For example, a file or data may be associated with a unique device's access to the file or data, or associated with a unique user's access to the file or data.

In another example embodiment, the vault server 210 may maintain a status indicator for whether or not the device is authorized to receive encryption keys. In some examples, the status indicator may correspond to a kill-pill status. If the device is lost, stolen, or the device user loses access privileges, it may be desirable to delete or otherwise disable access to the encrypted information from the client device. In one embodiment, a vault server administrator can set the kill-pill state for the device to kill. This state may be set using a flag. If the kill-pill flag is set, the vault server 210 responds to the receipt of the device identifier by transmitting a kill-pill to the client computer 106. After receiving the kill-pill, the client computer 106 in one embodiment prevents the transfer of any encryption key stored on the device to other devices, and also causes (e.g., instructs) the client computer 106 to delete the one or more encryption keys stored on the device. In one embodiment, the client computer 106 is also caused and/or instructed to delete any encrypted files stored on the device. In one example, if the device is lost, a single kill-pill may cause all keys and data on the device to be erased without requiring authentication.

If the kill-pill flag is not set, then the vault server 210 transmits the device state to the client computer 106. The device state may indicate that the device identifier was found and that the device is cleared to continue in the authentication process. In another embodiment, only a "kill" status will trigger a kill-pill, so the device-state flag may be blank or not set, indicating a "no kill." After receiving a device state that does not include a kill-pill, the client computer 106 transmits the token 218 to the vault server 210.

The vault server 210 receives the token 218 from the data plugin 204. After receiving the token 218, the vault server 210 sends the token 222 to the data storage server 106. The vault server 210 transmits the token 222 to the data storage server 106 to confirm the validity of the token and that the user is authenticated to the data storage server 106. In one embodiment, this includes confirming that the user has authenticated to the data storage interface 206. The vault server 210 may, in one embodiment, request that the data storage server 106 confirm with the domain server that the user is a member of a particular domain group. The user's domain group membership information may be included in the validation token received by the vault server 210. In another embodiment, the data storage server 106 maintains a record of the users that have authenticated within a most recent period of time. For example, the data storage server might maintain a list of all users that have authenticated and received validation tokens 214 within the last 60 minutes. If the user has authenticated to the data storage server 106, the data storage server 106 sends a validation 224 to the vault server 210 confirming that the user has authenticated to the data storage server 106.

After the vault server 210 receives a validation/confirmation 224 from the data storage server 106 that verifies the user authentication, the vault server 210 determines whether to transmit to the user decryption keys—also known as secrets—or portions thereof that enable the user to decrypt the encrypted files. The vault server 210 may determine whether to transmit keys to a user based on a user's domain group memberships. In a particular example, the vault server 210 may compare the user's domain group memberships with group membership information stored in association with the requested key/secret. In another example, the vault server 210 may determine group membership requirements from the data storage server or the domain server. In yet another example, the vault server 210 may determine group membership requirements from the requested encrypted file/data.

In some examples, access privileges may be based on user-specific credentials unrelated to group membership. For example, the authenticated user may be authorized for access to encrypted documents relating to the user's corporate role while at the same time having access that is also granted to other users. For example, a corporate executive may have exclusive access to documents on a corporate acquisition as well as access to shared accounting documents that are also accessed by many other people. In another example, shared access to encrypted data may be disjoint from membership to groups within a domain. Therefore, in one example embodiment, the vault server 210 may determine that the user alone is authorized for singular access to keys corresponding to a set of files, as well as shared access to keys corresponding to a different set of files. If the vault server 210 confirms that the user has the appropriate credentials to receive the secret, the vault server 210 transmits key 220 to the data plugin 204. In one embodiment, the key 220 is referred to as a secret.

The process for validating the token with the vault server 210 repeats for as many vault servers as exist. For example, in one embodiment there are two vault servers. So after receiving the key 220 from the first vault server, the data plugin 204 authenticates to the second vault server 210 by transmitting a device identifier, receiving a non-kill-pill state, transmitting the token 218, and receiving a second key 220. Alternatively, retrieval/authentication with the multiple vault servers may be performed simultaneously or substantially in parallel.

The key/secret 220 is used for decrypting the encrypted data using data decryption methods known in the art. In an embodiment using two vault servers, there are two secrets. The first key/secret or the second key/secret alone only allows the computing device to decrypt a portion of the data, such as the filename, file size, or other information about the file. In order to fully decrypt the data, including the file data (e.g., the portion), both the first secret and the second secret are required. For example, the first secret and the second secret may both be required to generate a decryption key configured to decrypting the portion of the data. In some examples, another decryption key may be generated based on only one of the first secret or second secret. The other decryption key might only allow for the decryption of a header or some portion of the file or data different from the portion of the data that is able to be decrypted using the decryption key generated using both secrets.

In an alternative embodiment, both the first secrets and the second secrets are required for authorizing the kill pill. For example, the client device might only authenticate a kill-pill that is signed (e.g., encrypted). The encryption of the kill-pill may thus require generation of the decryption key using both first and second secrets/keys. In another example embodiment, neither authentication nor authorization is required to transmit a kill-pill to a device. In another example, the device utilizes the kill-pill without authenticating or authorizing the kill-pill or its origin.

Having multiple secrets allows for better control over the data. For example, if an entity is concerned about data security, the entity might implement two vault servers, each storing a different secret. Different administrators may have access to the different vault servers. If the company has 100 administrators, 95 of those might only have access to either one or the other of the vault servers, while only 5 administrators have access to both vault servers. This way the majority of the administrators are able to assist most users with common concerns, such as identifying a particular file location, or activating a kill pill for a particular device. But because only a small number of individuals have access to both encryption secrets—namely, authenticated users and the small subset of administrators (in the example embodiment, the 5 administrators)—the data in the encrypted files cannot be viewed or accessed even by many administrators. This helps maintain data security by restricting access to those truly with a need-to-know.

In some instances it may be desirable to store encrypted data on the local client device instead of on the data storage server 106. For example, if a client device will be used without network access, such as on an airplane or boat without Internet access, it may be useful to access files that are otherwise stored on the data storage server. In one embodiment, after decrypting the data, the computing device 102 may re-encrypt the decrypted data using another encryption key different from an encryption with which the data is encrypted by the data storage server.

Figure 3:
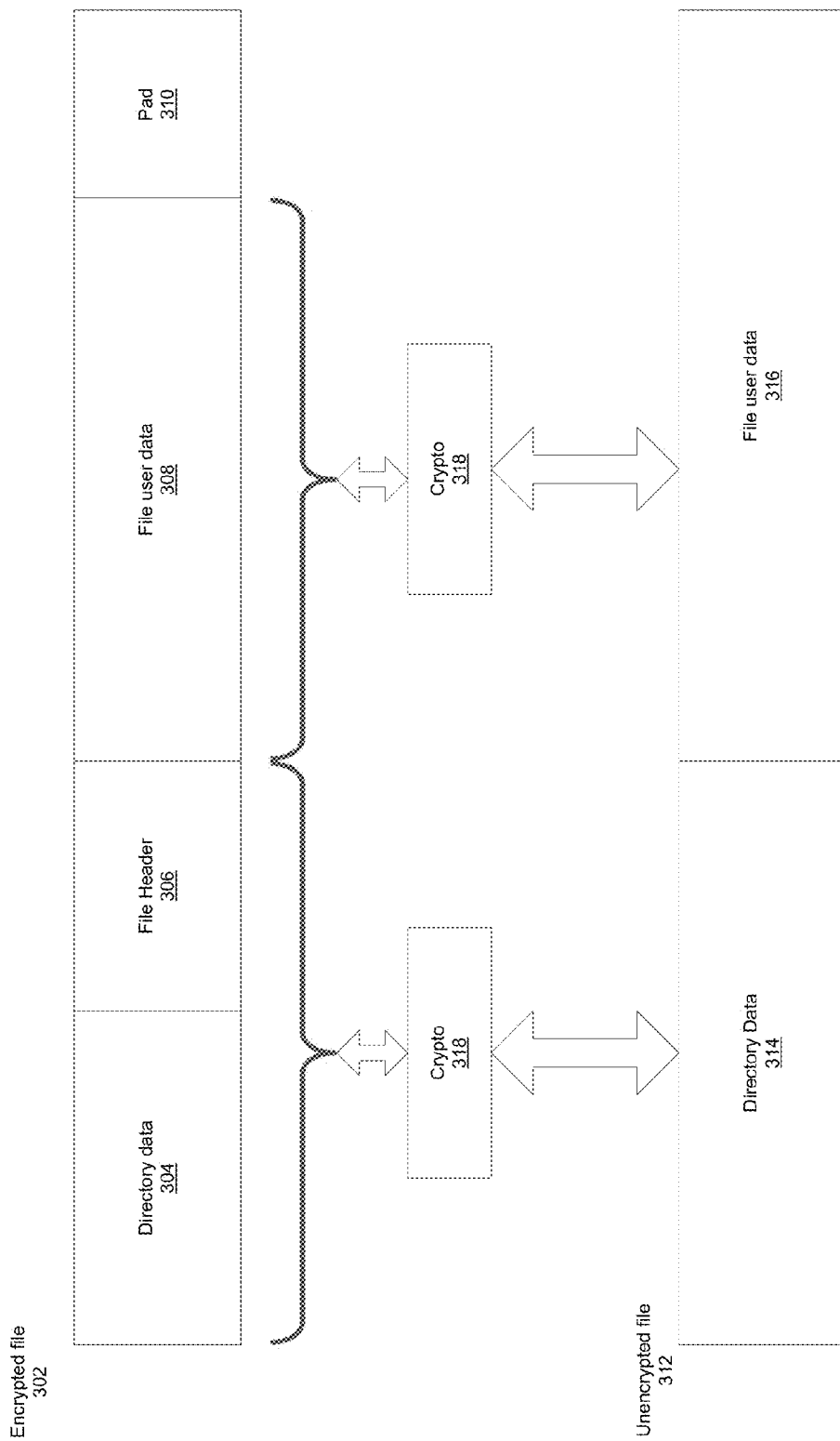
FIG. 3 illustrates example structures of an encrypted file and of an unencrypted file according to aspects described herein.

FIG. 3 is a block diagram illustrating an encrypted file 302 and an unencrypted file 312. The encrypted file 302 may include multiple elements, including directory data 304, file header 306, file user data 308, and file padding 310. Each of these elements will be described in turn.

The directory data 304 includes directory information about the file. For example, the directory data 304 includes the filename in encrypted form. The filesize is also included. The filesize is a combination of the file sizes of the file header 306, the file user data 308, and the file padding 310. The directory data 304 is the data that is visible to the operating system 123.

The file header 306 includes cryptographic salt in clear text. In one embodiment, cryptographic salt may be used as an element in generating the encryption key. The file header 306 also includes, in encrypted format, the file size.

The file user data 308 or portion of the data includes the data of the file. For example, the file user data 308 could include the text in a text file or the image data in an image file. The file user data 308 is encrypted.

The file padding 310 is a chunk of data that pads the file so as to improve security and/or to conform the data structure to a size expected by a particular storage protocol. Padding 310 in one embodiment is stored as random bytes so as to be indistinguishable from encrypted file user data.

The file header 306, file user data 308, and file padding 310 combined are viewed by the operating system 123 as the file data. Because the actual size of the file user data 308 is not discernible when the file is encrypted, file security may be improved.

The unencrypted file 312 includes directory data 314 and file user data 316. Each will be described in turn.

Directory data 314 is seen by the operating system 123. The directory data 314 include the filename in unencrypted clear text. Also included is the filesize indicating the true size of the file.

File user data 316 is the decrypted file data. This could be data of any file type, from a word processing document to a spreadsheet to a picture or video file. As is known in the art, any type of file may be encrypted.

The file information may be encrypted using various cryptographic methods 318. The directory data 314, when encrypted, may be split into the directory data 304 and file header 306. When the operating system 123 is handling the encrypted file 302, only the directory data 304 might be viewable as directory data. As described earlier, in some examples, the file header 306, file user data 308, and file padding 310 may all be considered by the operating system 123 to be the file data.

Figure 4:
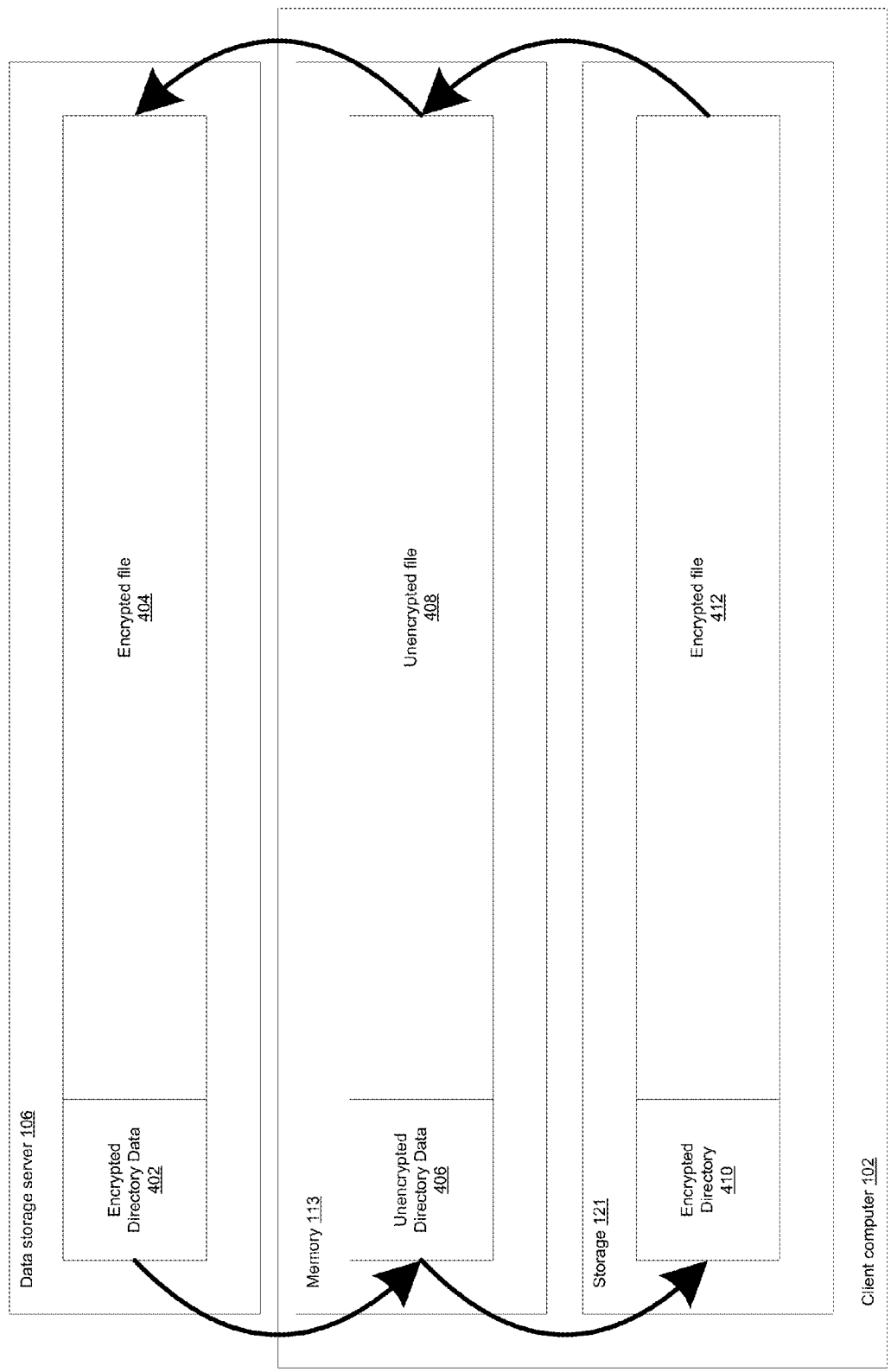
FIG. 4 is a flowchart illustrating an example data synchronization process between a data storage server and a computing device according to aspects described herein.

FIG. 4 illustrates an example synchronization process by which data is transferred to and from a client device. A data storage server 106 stores one or more encrypted data files. The file may be encrypted as described above according to a first encryption key. The encrypted directory data 402 and encrypted file contents 404 are encrypted while stored on the server. When the file is transferred to the client computer 102, the file is decrypted as part of the synchronization process. For example, the client computer 102 authenticates as described above in connection with FIG. 2, receiving a decryption key.

When the encrypted data is transferred to the client computer 102, the data plugin 204 uses the decryption key to decrypt the files. The decrypted file, made up of the unencrypted directory data 406 and the unencrypted file data 408 is loaded into memory 113. The user can then view, edit, or otherwise work with the file while the file is loaded in memory 113.

If the user gives the command to save the file to local storage 121, then the data plugin 104 encrypts the file using a second encryption key (e.g., a local encryption key) that is different than the first encryption key with which the data is encrypted when stored on the storage server. For example, a decryption key generated using the secrets received from the one or more vault servers 210 may be configured to decrypt data encrypted using the first encryption key, but not the second, local encryption key. The locally encrypted file, made up of the encrypted directory data 410 and the encrypted file contents 412, is then stored in the local storage 121.

If the user gives the command to save the file to the data storage server 106, the data plugin 204 encrypts the unencrypted file loaded in memory 113, and then uploads the encrypted file to the data storage server 106. In another example, if the user wants to synchronize the locally stored data to the storage server 106, the data plugin 204 or client device 102 may decrypt the locally stored data and re-encrypt the data using the first encryption key. In another example, after decrypting the locally stored data (encrypted using the second encryption key), the data may be passed to the storage server 106 for encryption using the first encryption key.

As described above, the encryption and decryption process is performed as part of the synchronization of the files and other data between the client computer 102 and the data storage server 106.

Figure 5:
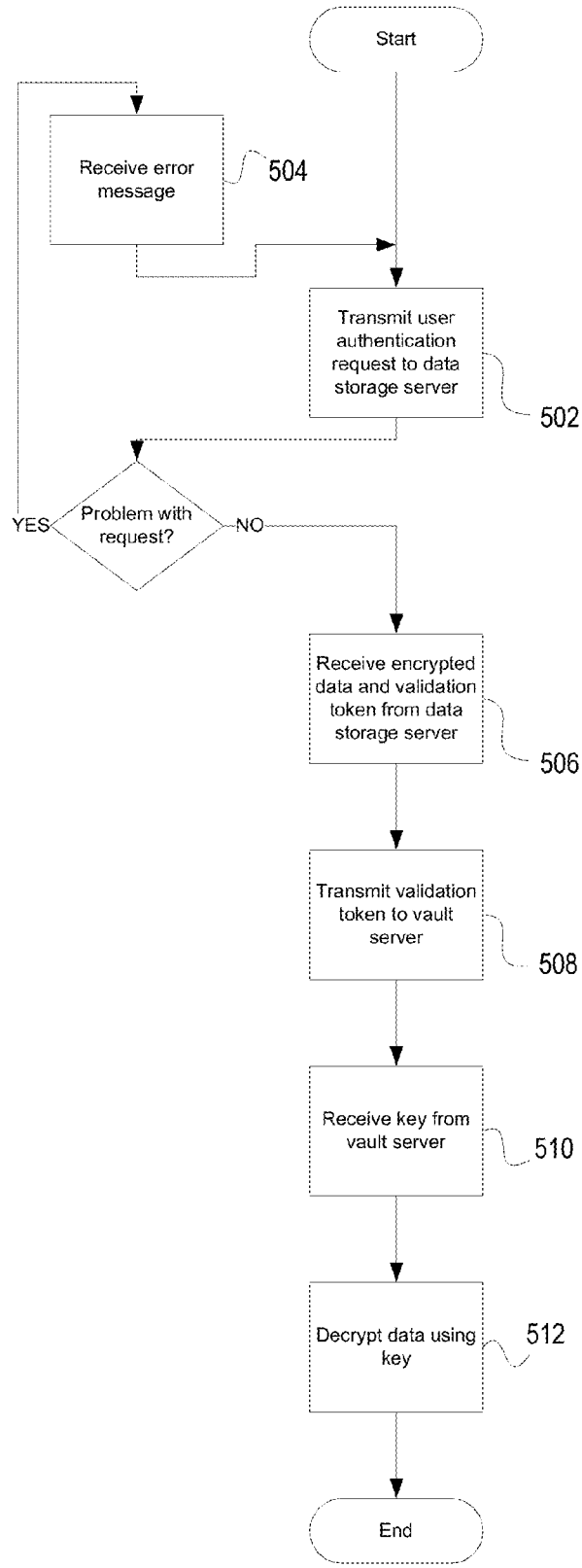
FIG. 5 is a flowchart illustrating an example process by which a computing device accesses encrypted data according to aspects described herein.

FIG. 5 is a flow chart diagram illustrating the process that a computing device such as a client computer 102 uses to access encrypted data stored in a storage server.

In step 502, the client computer 102 transmits a user authentication request for decrypting encrypted data to a data storage server 106 storing the encrypted data. The user authentication request may include user credentials, such as a username and a password. The user authentication request may also include a listing or description of one or more file or folder names that the user wishes to access.

In step 504, if there is a problem with the user authentication request, for example a nonexistent username or incorrect password, the client computer 102 may receive an error message. Similarly, if the user does not have rights to access the data that the user requested to access, the client computer may also receive an error message.

If the user authentication request contains valid user credentials and the user has access privileges for the requested data, in step 506 the client computer 102 receives the requested encrypted data and a validation token from the data storage server. In another embodiment, the client computer 102 might receive only a validation token from the data storage server. The validation token may, in one embodiment, be associated with the user's authentication request and may indicate that the user is a member of one or more domain groups. For example, as noted above, the data storage server may connect to a domain server, and determine if the user exists on the domain, and if the user is a member of one or more domain groups.

In step 508, the client computer 102 then transmits the validation token to a first key server different from the data storage server. The key server may be known as a vault server, such as the vault server 210. As discussed herein, the first key server or vault server may be located in a physically separately from and in a different domain than either the client computer 102 or the domain server 208 or both.

In response to transmitting the validation token, in step 510 the computing device 102 may receive from the first key server a key/secret required for decrypting the encrypted data (e.g., if the user's access privileges are determined to match the required credentials for receiving the requested access key/secret).

In step 512, the computing device 102 decrypts at least a portion of the encrypted data using the key. In another embodiment, the computing device 102 might not receive the encrypted data with the validation token in step 506, but instead might not receive the encrypted data until after step 510 when the computing device 102 has received the necessary key/secret from the key server. In an example embodiment, the computing device 102 might transmit to the data storage server a confirmation that the computing device 102 received the key/secret from the key server, and in response receive the encrypted data.

Figure 6:
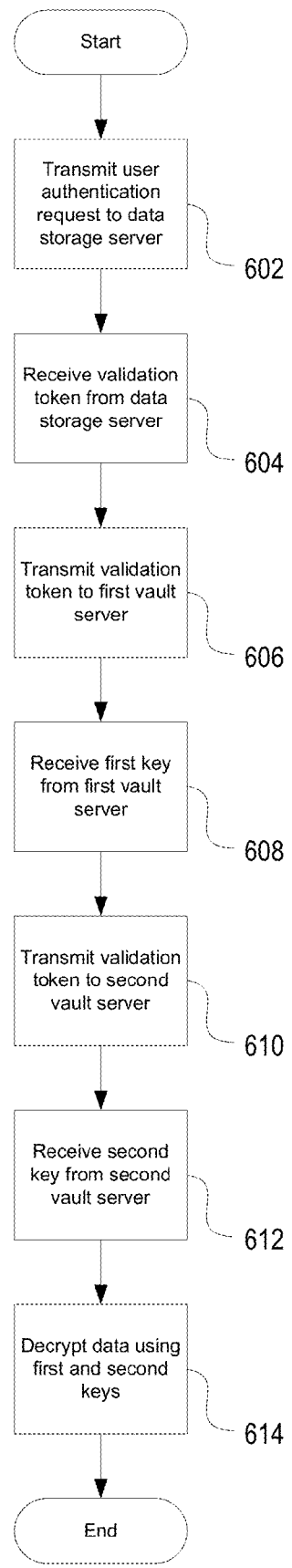
FIG. 6 is a flowchart illustrating an example process by which a computing device accesses encrypted data with multiple key vault servers according to aspects described herein.

FIG. 6 is a flow chart diagram illustrating a process that a client device such as client computer 102 may use to access encrypted data when there is more than one vault server. A vault server may also be known as or referred to as a key server. In the illustrated embodiment, there are two vault servers. In another embodiment, there may be more than two vault servers. For example, there could be three vault servers, four vault servers, or N vault servers. With each vault server, there may be an additional layer of security and protection, because in order to decrypt a file, in one embodiment, the user receives decryption keys from every vault server, the combination of those keys decrypting the encrypted data.

In step 602, the client computer 102 transmits a user authentication request to a data storage server, and in step 604 receives a validation token from the data storage server, in a substantially similar manner to that described in association with FIG. 5.

In step 606, the client computer 102 transmits a validation token to a first vault server 210. The first vault server 210 confirms that the token is valid and that the client computer 102 has authenticated to a data storage server 106. Then, in step 608, the client computer receives a first key (or first encryption secret) from the first vault server.

In step 610, the client computer then transmits the validation token to a second vault server. The second vault server 210 confirms that the token is valid and that the client computer 102 has authenticated to a data storage server 106. Then, in step 612, the client computer receives a second key (or second encryption secret) from the second vault server. As noted above, the first key (secret) and the second key (secret) may require different credentials. For example, the first key or secret may only provide access to a header or other portion of the encrypted data while the combination of the first and second key provides access to another portion or an entirety of the data. In a particular example, the first key/secret may require group membership in either a first group or a second group, while the second key/secret may require group membership in the second group.

In another embodiment, the client computer transmits the validation token to both the first vault server and the second vault server at the same time, instead of waiting to receive a first key from the first vault server before transmitting the validation token to the second vault server.

In the case of two vault servers, in step 614, after the client computer 102 has received both decryption keys, the data plugin 204 generates a decryption key using the keys/secrets using various key generation methods and protocols. The decryption key may then be used to decrypt the encrypted data received from the storage server.

Figure 7:
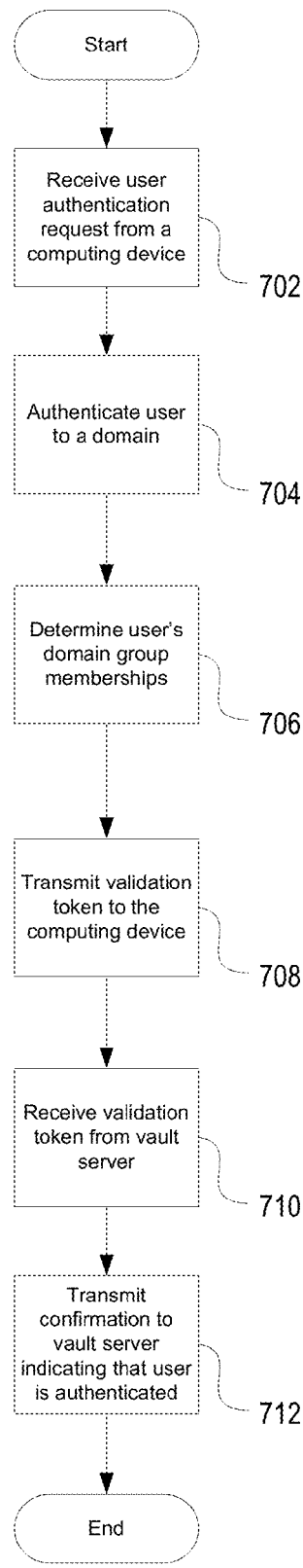
FIG. 7 is a flowchart illustrating an example process by which a data storage server authenticates a computing device for data access according to aspects described herein.

FIG. 7 is a flow chart diagram illustrating a process for a data storage server storing encrypted data, such as data storage server 106, to manage access rights.

In step 702, the data storage server 106 receives a user authentication request for decrypting encrypted data. In one embodiment, the user authentication request comes from a client device, such as client computer 102. The user authentication request includes user credentials such as a username and password. In step 704, the data storage server then uses the user credentials to authenticate the user to a domain. In one example embodiment, an entity/organization may use a domain to manage employee access to computing resources. An example of domain software that may be used includes, as noted above, Active Directory, by MICROSOFT of Redmond, Wash. If the user credentials are not valid in step 704, the data storage server 106 returns an error message to the computing device.

Each user within the domain may be assigned to groups within the domain. For example, if a user is an accountant within an organization, the user may be associated with a group on the domain called "Accountants." After authenticating the user to the domain, the domain may in step 706 determine the user's domain group memberships, and transmit the user's domain group membership information to the data storage server 106. By authenticating a user to a domain, an organization may, in one example embodiment, be able to store encrypted data on a server separate from the domain server while still allowing control over access rights based on the group memberships. Some advantages of storing encrypted data on a server separate from the domain server may include that the organization's employees or contractors may be able to access company data more easily from around the planet, or that the organization may be able to better manage security of the domain server and those with access to it. Additionally or alternatively, the company or organization may thus be relieved of the expense of having to maintain large data stores.

In step 708, the data storage server 106 then transmits a validation token associated with the user's authentication request. The validation token may include the user's domain group membership information. For instance, the data storage server 106 may transmit a validation token to the client computer 102 device indicating that the user is a member of the "Accountants" group. In another example, the validation token may specify an access rights level assigned to the user. In such an example, the validation token may thus be used to retrieve multiple files that are within the user's or group's access rights.

The data storage server 106 then receives a confirmation request associated with the user's validation token. The confirmation request may be received from a vault server controlling encryption keys. The confirmation request seeks to confirm that the client device authenticated to the data storage server, and received the validation token in response to said authentication. In one example, the confirmation request may include the validation token received from the user device. In other examples, the validation token might not be included in the confirmation request. Instead, a user or token identifier may be referenced in the confirmation request.

Alternatively or additionally, if group membership information is not included in the validation token, the data storage server 106 may receive a request from the vault server 210 to verify group membership information. In response, the data storage server 106 may forward the group membership information for the requesting user to the vault server 210. In a particular example, the data storage server 106 may request this information from the domain server and subsequently pass the data to the vault server.

If the validation token is authenticated and/or the user's domain group memberships are confirmed, in step 712 the data storage server 106 then transmits a confirmation to the vault server indicating that the user is authenticated to the data storage server. Otherwise, the data storage server 106 may indicate that the confirmation was not verified and cause the vault server to deny the key retrieval request. In some examples, the data storage server 106 may re-confirm the user's domain group memberships with the domain server upon receipt of the confirmation request. In other examples, the data storage server may independently confirm the validation token and/or user's domain group memberships without interaction with the domain server in response to the request.

Figure 8:
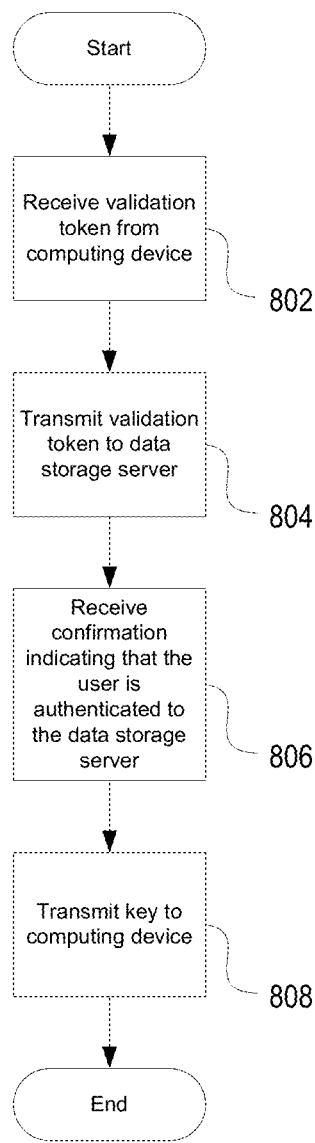
FIG. 8 is a flowchart illustrating an example process by which a key vault server interacts with a computing device for data access management according to aspects described herein.

FIG. 8 is a flow chart diagram illustrating a process for a vault server, such as vault server 210. A vault server, as described above, maintains encryption and decryption keys/secrets. There may be one or more vault servers. A vault server may, in one embodiment, be located at a different physical location than a data storage server, and in another embodiment multiple vault servers may be located at different physical locations than each other. In an alternate embodiment, multiple vault servers may be all located at the same physical location. In a further embodiment, multiple vault servers exist as virtual machines on one physical machine.

In step 802, the vault server receives a validation token from a computing device, such as client computer 102. The validation token, in one embodiment, indicates a data storage server from which the validation token was received. The validation token may also provide group membership information associated with the user.

In step 804, the vault server transmits the validation token to the data storage server as part of a confirmation request. The confirmation request seeks to verify that the computing device is authenticated to the data storage server.

If the user is not authenticated to the data storage server, the vault server receives an error message. If the computing device is authenticated to the data storage server, in step 806 the vault server receives confirmation indicating that the computing device is authenticated to the data storage server.

Upon receiving a confirmation from the data storage server, the vault server then in step 808 transmits a decryption key to the computing device for decrypting the encrypted files. But, if an error message is received, the vault server may instead transmit a denial or rejection message indication verification was not confirmed by the data storage site. Additionally or alternatively, prior to transmitting the decryption key/secret to the client device, the vault server may determine whether the user is authorized to receive the decryption key/secret and/or to access the encrypted file. For example, the vault server may compare the user's group memberships with group information stored in association with the decryption key/secret. The group information stored in association with the decryption key/secret may identify the groups that have permission to receive the key/secret. In another example, the encrypted file may include metadata or other indications of one or more groups authorized to access the encrypted file. This information may then be compared, by the vault server, to the user's group membership to determine whether the requesting user is authorized to access the data and receive the decryption secret/key.

In some arrangements, the vault server may be configured to contact the domain server to confirm domain group membership in addition to or alternatively to confirming the validation with the data storage server. Accordingly, upon receiving a validation token from the client device, the vault server may contact the domain server (without communicating with the data storage server) to confirm the user's authentication status or domain group memberships. The vault server may also confirm the validation token with the data storage server (e.g., in addition to contacting the domain server for confirmation). The vault server may require confirmation from both the data storage server as well as the domain server before providing the client device with the decryption key or secret.

In still other examples, the domain server and/or the data storage server may be configured to verify that the user is authorized to access a requested encrypted file and to receive the corresponding decryption key/secret.

Figure 9:
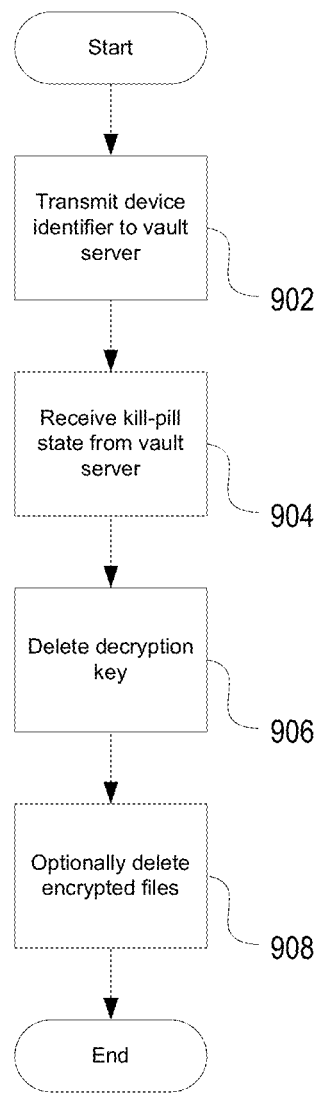
FIG. 9 is a flowchart illustrating an example process for deleting secured data stored on a client device by a server according to aspects described herein.

FIG. 9 is a flow chart diagram illustrating the process for an endpoint device to receive and process a "kill pill" command. In one embodiment, the endpoint device is the client computer 102.

In one embodiment, a security agent on the computing device may be configured to periodically contact a server, authentication server, security server, or other entity, either at predetermined intervals, whenever the computing device finds a new network connection, or at other times and/or under other conditions. The security agent may comprise a service, daemon, application, routine, or other executable code for communicating with a server and deleting any locally stored decryption keys and encrypted data. The contact may be initiated manually in some examples as well. In some embodiments, the server may be configured to deliver a "kill pill", token, or other message indicating that the security agent should delete the encrypted data. For example, if a consultant's contract expires or a user is terminated from the corporation, or the user notifies the organization that their computing device has been stolen or otherwise compromised, an administrator may configure the server to deliver the kill pill to the computing device to delete the user header (e.g., without deleting the administrator header) and prevent the user from accessing the encrypted data.

In another example, the security agent may also act as a "dead man's switch" in case the computing device is offline for an extended period. The security agent may execute a timer function. If the timer, representing a "lease period" or how long the user can use the encrypted data without needing to communicate with a security server, expires, the security agent may automatically delete the decryption key and/or the encrypted data (e.g., without contacting the data storage server, vault server and/or the like). This may be done to prevent an attacker from using a brute force attack on the decryption key while keeping the computing device offline, or otherwise force a user to periodically check in with the server (and incidentally retrieve any kill pill that is waiting to be delivered).

In step 902, the client computer 102 transmits a device identifier to a vault server. For example, this could be a MAC address, an IP address, a hostname, a machine name, or some other unique identifier identifying the device 102.

In step 904, the client computer 102 then receives a device state from the vault server. If the device state is empty or "good" or something other than the kill-pill state, the client computer 102 continues with the authentication process.

It may be that the device was lost or stolen. In another case, it may be that the user no longer has access privileges to the encrypted data, such as if the user is no longer working with the organization controlling the encrypted data. An administrator may access one or more vault servers and activate or otherwise authorize a device kill pill. The administrator might activate a kill pill for each user device, such as if the user is no longer working with the organization. Alternatively, it may be that the administrator only wishes to trigger a kill pill for a single device, but continue to allow a user to access the encrypted data on a second user device. For example, if the user's cellular telephone has an application—or app—installed that allows the user to access or view encrypted data, and the user's cellular telephone is lost or stolen, it may be desirable to deny decrypting access to and erase the encrypted data from the user's cellular telephone.

In step 906, in response to receiving a kill-pill state from the vault server in step 904, the client computer 102 deletes the decryption key from the client computer 102. It may be that the user has recently authenticated to the vault server, so the decryption key is stored in memory 113. Alternatively, if the client has saved encrypted data to local storage 121, there may be a local decryption key, different from the server decryption key, stored on the client computer 102. The client computer, upon receiving 904 the kill-pill state from the vault server, immediately prevents the transfer of the decryption key from or by the client computer 102. The client computer 102 closes or otherwise disables access to the decrypted file or data, and erases the decryption key from memory 113. The client computer 102 also erases any and all local decryption keys stored in local storage 121. When deleting a locally stored decryption key, the client computer 102 may use secure data erasure techniques, such as multiple random reads/writes, or another secure data erasure technique to ensure that the decryption key cannot be recovered at a later time.

In step 908, the client computer 102 may optionally delete encrypted files from the client computer 102. There may be, as described above, a decrypted file loaded into memory 113. Upon receiving the kill-pill state, the client computer 102 immediately closes or disables access to the decrypted file. In step 908, the client computer also deletes the decrypted or still-encrypted files from memory 113. If any encrypted files are stored in local storage 121, the client computer 102 deletes the encrypted files from local storage 121. In one embodiment, the client computer 102 uses secure data erasure techniques to ensure that the encrypted data cannot be recovered at a later time.

In another example embodiment, the kill-pill removes end-user access to the data through removing only the encrypted data. In a further example embodiment, the kill-pill removes access to data by removing both the key information and the encrypted data.

As discussed above, in one embodiment, if the decryption key is deleted, either via a kill pill or expiration of the timer, the encrypted data may not be lost. If the user is still privileged or part of the organization, the user may log in or otherwise authenticate to the server and retrieve the cryptographic secrets or decryption keys to decrypt the encrypted data. If the encrypted data was deleted, after re-authenticating, the client computer 102 may load or download the encrypted data again. Accordingly, the methods and systems discussed herein provide additional security without destruction of corporate information.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed is:

1. A method comprising:
receiving, by a data storage server storing encrypted data, a user authentication request for decrypting the encrypted data from a client device;
transmitting, by the data storage server, a validation token associated with the user authentication request to the client device, wherein the validation token indicates that the client device successfully authenticated;
receiving, by the data storage server, a confirmation request associated with the validation token from a second device that is different from the client device; and
transmitting, by the data storage server, a confirmation to the second device indicating that the client device is authenticated to the data storage server.

2. The method of claim 1, further comprising, prior to transmitting the validation token:
authenticating the client device to a domain; and
determining, based on a domain group membership of the client device, data accessible to the client device, wherein a domain group comprises a plurality of domain group memberships respectively associated with a plurality of client devices.

3. The method of claim 1, wherein the second device comprises a first key server, and the confirmation request is sent by the first key server in response to receiving the validation token from a computing device, the first key server configured to store at least a portion of a decryption key for decrypting the encrypted data.

4. The method of claim 3, further comprising:
receiving, by the data storage server, from a second key server, a second confirmation request associated with the validation token; and
transmitting, by the data storage server, to a second key server, a second confirmation indicating that the client device is authenticated to the data storage server.

5. The method of claim 3, wherein one or more of the first key server and a second key server transmits a kill pill to the computing device, the kill pill including instructions to delete one or more of the key and the encrypted data.

6. The method of claim 1, wherein the confirmation is associated with a key required for decrypting the encrypted data.

7. The method of claim 5, wherein the kill pill is authorized by a key-server administrator.

8. The method of claim 3, comprising:
receiving, by the client device, from the first key server, a first key required for decrypting the encrypted data;
receiving, by the client device, from a second key server, a second key required for decrypting the encrypted data; and
using the first key and the second key to generate a decryption key that is used for decrypting the encrypted data.

9. A data storage server comprising:
at least one processor; and
non-transitory memory storing executable instructions configured to, when executed by the at least one processor, cause the data storage server to:
receive, from a client device, a user authentication request for decrypting encrypted data;
transmit, to the client device, a validation token associated with the user authentication request, the validation token indicating that the client device successfully authenticated;
receive, from a second device that is different than the client device, a confirmation request associated with the validation token; and
transmit, to the second device, a confirmation indicating that the client device is authenticated.

10. The data storage server of claim 9, wherein the non-transitory memory stores executable instructions configured to, when executed by the at least one processor, cause the data storage server to:
authenticate the client device to a domain; and
determine, based on membership of the client device in a domain group of the domain, data accessible to the client device,
wherein the domain group comprises a plurality of memberships respectively associated with a plurality of client devices.

11. The data storage server of claim 9, wherein the second device comprises a first key server, and the first key server sends the confirmation request in response to receiving the validation token from a computing device, the first key server configured to store at least a portion of a decryption key for decrypting the encrypted data.

12. The data storage server of claim 11, wherein the non-transitory memory stores executable instructions configured to, when executed by the at least one processor, cause the data storage server to:
   receive, from a second key server, a request for a second confirmation associated with the validation token; and
   transmit, to a second key server, a second confirmation indicating that the client device is authenticated.

13. The data storage server of claim 11, wherein one or more of the first key server and a second key server transmits a kill pill to the computing device, the kill pill comprising instructions to the computing device to delete one or more of the key and the encrypted data.

14. The data storage server of claim 9, wherein the confirmation is associated with a key required for decrypting the encrypted data.

15. One or more non-transitory computer-readable media storing computer-readable instructions that, when executed by at least one processor, cause one or more data storage servers to:
   receive, from a client device, a user authentication request for decrypting encrypted data;
   transmit, to the client device, a validation token associated with the user authentication request, the validation token indicating that the client device successfully authenticated;
   receive, from a second device that is different than the client device, a confirmation request associated with the validation token; and
   transmit, to the second device, a confirmation indicating that the client device is authenticated.

16. The one or more non-transitory computer-readable media of claim 15, storing computer-readable instructions that, when executed by the at least one processor, cause the one or more data storage servers to:
   authenticate the client device to a domain; and
   determine, based on membership of the client device in a domain group of the domain, data accessible to the client device,
   wherein the domain group comprises a plurality of memberships respectively associated with a plurality of client devices.

17. The one or more non-transitory computer-readable media of claim 15, wherein the second device comprises a first key server, and the first key server sends the confirmation request in response to receiving the validation token from a computing device, the first key server configured to store at least a portion of a decryption key for decrypting the encrypted data.

18. The one or more non-transitory computer-readable media of claim 17, storing computer-readable instructions that, when executed by the at least one processor, cause the one or more data storage servers to:
   receive, from a second key server, a request for a second confirmation associated with the validation token; and
   transmit, to a second key server, a second confirmation indicating that the client device is authenticated.

19. The one or more non-transitory computer-readable media of claim 17, wherein one or more of the first key server and a second key server transmits a kill pill to the computing device, the kill pill comprising instructions to the computing device to delete one or more of the key and the encrypted data.

20. The one or more non-transitory computer-readable media of claim 15, wherein the confirmation is associated with a key required for decrypting the encrypted data.

21. The one or more non-transitory computer-readable media of claim 19, wherein the kill pill is authorized by a key-server administrator.

22. The one or more non-transitory computer-readable media of claim 17, storing computer-readable instructions that, when executed by the at least one processor, cause the one or more data storage servers to:
   receive, by the client device, from the first key server, a first key required for decrypting the encrypted data;
   receive, by the client device, from a second key server, a second key required for decrypting the encrypted data; and
   use the first key and the second key to generate a decryption key that is used for decrypting the encrypted data.

23. The data storage server of claim 13, wherein the kill pill is authorized by a key-server administrator.

24. The data storage server of claim 11, wherein the non-transitory memory stores executable instructions configured to, when executed by the at least one processor, cause the data storage server to:
   receive, by the client device, from the first key server, a first key required for decrypting the encrypted data;
   receive, by the client device, from a second key server, a second key required for decrypting the encrypted data; and
   use the first key and the second key to generate a decryption key that is used for decrypting the encrypted data.

* * * * *